United States Patent
Liang et al.

(10) Patent No.: US 11,754,860 B2
(45) Date of Patent: Sep. 12, 2023

(54) PHOTOCHROMIC LENS WITH LAMINATED FILM, METHOD FOR PRODUCING A PHOTOCHROMIC LENS, AND A SPECTACLE FRAME

(71) Applicants: Carl Zeiss Vision Technical Services Guangzhou Ltd., Guangzhou (CN); Carl Zeiss Vision International GmbH, Aalen (DE)

(72) Inventors: Jingye Liang, Guangzhou (CN); Liu Ouyang, Guangzhou (CN); Stephen Brown, Adelaide (AU); Yong Tian, Guangzhou (CN)

(73) Assignee: Carl Zeiss Vision International GmbH, Aalen (DE)

( * ) Notice: Subject to any disclaimer, the term of this patent is extended or adjusted under 35 U.S.C. 154(b) by 697 days.

(21) Appl. No.: 16/724,210

(22) Filed: Dec. 21, 2019

(65) Prior Publication Data
US 2020/0201079 A1 Jun. 25, 2020

Related U.S. Application Data

(63) Continuation of application No. PCT/CN2018/123150, filed on Dec. 24, 2018.

(51) Int. Cl.
*G02C 7/10* (2006.01)
*B29D 11/00* (2006.01)
(Continued)

(52) U.S. Cl.
CPC .......... *G02C 7/102* (2013.01); *B29D 11/0048* (2013.01); *B29D 11/00884* (2013.01);
(Continued)

(58) Field of Classification Search
CPC . G02C 7/102; G02B 5/23; G02B 1/04; B29D 11/00903; B29D 11/0048; B29D 11/00884
See application file for complete search history.

(56) References Cited

U.S. PATENT DOCUMENTS 7,858,001 B2   12/2010   Qin et al.
8,367,211 B2 *  2/2013   Qin .................... B29D 11/0073
                                                   428/424.4

(Continued)

FOREIGN PATENT DOCUMENTS

CN    205539780 U    8/2016
CN    107861263 A    3/2018
(Continued)

OTHER PUBLICATIONS

"Augenoptik—Rohkantige fertige Brillengläser—Teil 3: Transmissionsanforderungen and Prüfverfahren [Ophthalmic optics—Uncut finished spectacle lenses—Part 3: Transmittance specifications and test methods]," DIN EN ISO 8980-3 (Ophthalmic optics—Spectacle lenses), dated Mar. 2014, and English version thereof, dated Mar. 2005.

(Continued)

*Primary Examiner* — Mathieu D Vargot
(74) *Attorney, Agent, or Firm* — Tautz & Schuhmacher LLC; Georg Hasselmann (57) ABSTRACT

An optical lens contains a laminated film, which includes a first adhesive layer, a first barrier layer, a photochromic layer, a second barrier layer, and a second adhesive layer. The layers are arranged in succession and the laminated film is substantially incorporated into the optical lens body. A method for producing this optical lens as well as a pair of spectacles containing this optical lens are also disclosed.

14 Claims, 2 Drawing Sheets

(51) Int. Cl.
  *G02B 5/23* (2006.01)
  *G02B 1/04* (2006.01)
(52) U.S. Cl.
  CPC .......... *B29D 11/00903* (2013.01); *G02B 5/23* (2013.01); *G02B 1/04* (2013.01)

(56) References Cited

U.S. PATENT DOCUMENTS

| | | |
|---|---|---|
| 2008/0187749 A1 | 8/2008 | Cael et al. |
| 2011/0116151 A1 | 5/2011 | Rossini et al. |
| 2015/0049303 A1 | 2/2015 | Chang et al. |
| 2015/0098057 A1 | 4/2015 | Qin et al. |
| 2018/0265680 A1 | 9/2018 | Parizat et al. |
| 2019/0179169 A1 | 6/2019 | Clerc et al. |

FOREIGN PATENT DOCUMENTS

| | | | |
|---|---|---|---|
| CN | 207096604 U | | 3/2018 |
| EP | 1560060 A1 | | 8/2005 |
| JP | 2004-122608 | * | 4/2004 |
| WO | 2016134688 A1 | | 9/2016 |
| WO | 2018019806 A1 | | 2/2018 |

OTHER PUBLICATIONS

DIN EN ISO 13666 (Ophthalmic optics—Spectacle lenses), dated Oct. 2013.
International Search Report issued in PCT/CN2018/123150, to which this application claims priority, dated Aug. 28, 2019.

\* cited by examiner

PHOTOCHROMIC LENS WITH LAMINATED FILM, METHOD FOR PRODUCING A PHOTOCHROMIC LENS, AND A SPECTACLE FRAME

CROSS REFERENCE TO RELATED APPLICATIONS

This application claims priority to international patent application PCT/CN2018/123150 filed on Dec. 24, 2018, which is hereby incorporated by reference in its entirety.

TECHNICAL FIELD

The present disclosure relates to a photochromic lens and to a method for producing the photochromic lens, as well as to a spectacle frame comprising the photochromic lens.

BACKGROUND

Photochromic lenses are optical lenses that darken or change color depending on the intensity and/or brightness of the incident light, such as sunlight and/or UV light. In the absence of sunlight and/or UV light, the photochromic lenses return to its clear state. That is to say, the darkness or coloration induced in the photochromic lenses fade if the exposure to sunlight and/or UV light is reduced or absent. The color changing function of these photochromic lenses is due to the presence of photochromic dyes in the optical lens. The darkening or coloration of the photochromic lenses takes place quickly, for example, within about a minute after exposure to bright sunlight. The recovery of the photochromic lenses to a clear state takes somewhat longer when the exposure to bright sunlight or UV light is reduced or absent.

This reversible color change is also designated as photochromism. Photochromism is the reversible transformation of a photochromic dye between two isomeric forms by the absorption of electromagnetic radiation, which is also designated as photoisomerisation. The two photoisomeric forms have different absorption spectra, leading to the reversible change of color upon exposure to light.

Thus, photochromic lenses are especially useful in spectacles for outdoor use or combined indoor and outdoor use or for spectacle wearers whose eyes have an increased sensitivity to sunlight.

Photochromic lenses can be produced by incorporation of at least one photochromic dye in a polymerizable composition containing radically polymerizable monomers, wherein the polymerizable composition is subsequently injected into a lens mold and cured to produce the photochromic lens. This production method is simple.

A photochromic dye can be sensitive to the radically polymerizable monomer(s), i.e., can be damaged by the radically polymerizable monomer(s) by unwanted chemical side reactions. In view of that photochromic dye(s) compatible with the radically polymerizable monomer(s) to be used for producing the photochromic lens have to be carefully selected or developed in order to provide photochromic lenses with a good photochromic performance and durability. Especially when using a mixture of photochromic dyes, all of these dyes must necessarily be compatible with the radically polymerizable monomer(s) to be used.

Another disadvantage of this approach is that a photochromic dye or mixture of photochromic dyes developed for specific radically polymerizable monomer(s) may not be used for other species of radically polymerizable monomer(s). Therefore, the design of a specific photochromic or photochromatic color and the use of specific polymeric materials in the optical lens body can be an unsolvable problem.

A further disadvantage of this approach is the nonuniform coloration or clarity, respectively, of the photochromic lens from the lens edge to the center, e.g., the geometrical center, which is according to DIN EN ISO 13666:2013-10, section 5.5, defined as the intersection of the horizontal and vertical centerlines of the rectangular box, which circumscribes the shape of the lens blank or uncut lens, due to the thickness difference. The thickness difference in the photochromic lens leads to a different amount of photochromic dye(s), depending on the specific position within the photochromic lens. This gradient of photochromic dye(s) is unwanted by the spectacle wearer.

Another method of producing photochromic lenses is to coat the surface, typically the front surface, i.e., according to DIN EN ISO 13666:2013-10, section 5.8, that surface of the spectacle lens intended to be fitted away from the eye, of the spectacle lens with a curable layer that contains photochromic dye(s). A disadvantage of this approach is that the photochromic layer can delaminate from the surface from the spectacle lens or that the photochromic layer is damaged due to mechanical impacts, such as scratches.

US 2008/0187749 A1 is directed to an optical element comprising at least a support polymeric film layer and a second polymeric film layer which exhibits photochromic and/or linearly polarizing light influencing properties/property. This polymeric film layer can be mounted on the surface of an optical lens.

US 2011/0116151 A1 discloses a photochromic multilayer structure, wherein a photochromic host matrix is formed between two supports, at least one of which is a plastic support. This photochromic multilayer structure is mounted on the surface of an optical lens.

US 2015/0098057 A1 is directed to a photochromic polyurethane laminate which can be applied to polymeric surfaces or can be used by itself as a photochromic element. The photochromic polyurethane laminate can also be incorporated into plastic lenses by means of injection molding. The photochromic polyurethane laminate is produced by preparing a casting solution, containing thermoplastic polyurethane, at least one isocyanate polyurethane prepolymer, and at least one photochromic compound, in a solvent. This casting solution is cast to produce a cast film which is transferred after evaporation of the solvent between two transparent resin sheets. Finally, the photochromic polyurethane film is cured forming the polyurethane laminate. Disadvantageously, the photochromic compounds are exposed to the isocyanate polyurethane prepolymers leading to damaging of the photochromic compounds by chemical side reactions. In view of that only photochromic compounds can be used having a certain compatibility or resistance against the reactive polyurethane prepolymers.

EP 1 560 060 A1 discloses a polarizing and/or photochromic plastic lens which comprises a laminate with a photochromic layer formed of a polyurethane-based resin. Disadvantageously, the photochromic compounds are exposed to the isocyanate polyurethane prepolymers leading to a damaging of the photochromic compounds. In view of that, only photochromic compounds having a certain compatibility or resistance against the reactive isocyanate polyurethane prepolymers can be used.

WO 2018/019806 A1 discloses an ophthalmic lens comprising a succession of thin layers wherein the outermost external layers are transparent substrate layers. CN 207096604 (U) discloses a sunglass with intelligence function of discoloring. CN 107861263 (A) discloses an improved colorful polarized sunglasses lens. CN 205539780 (U) discloses an antifog antibacterial type chameleon glass block. US 2015/0049303 A1 discloses a photochromic composite lens comprising a transition layer of photochromic dye sandwiched between the front and rear lens layers.

Consequently, there is a need of photochromic lenses, wherein photochromic dye(s) can be generally used irrespective of consideration of the monomeric or prepolymeric starting compounds used to produce the photochromic lens or the layer containing the photochromic dye(s).

SUMMARY

It is therefore an object of the disclosure to provide a respective photochromic lens, wherein photochromic dye(s) can be used independently from the specific composition of the monomeric or (pre)polymeric compounds used to manufacture the optical lens body. It is furthermore an object, to provide a respective method for producing the photochromic lens, as well as to provide a spectacle frame comprising the photochromic lens.

The object of the disclosure is solved by providing a photochromic lens comprising a laminated film and an optical lens body, the laminated film comprising at least
an adhesive layer (a),
a barrier layer (b),
a photochromic layer (c),
a barrier layer (d), and
an adhesive layer (e),
wherein the layers (a) to (e) are arranged in succession or in a layer sequence (a) to (e) and wherein the laminated film is substantially incorporated, typically completely, within the optical lens body.

Exemplary embodiments are specified below.

The object of the disclosure is also solved by providing a spectacle frame comprising a photochromic lens as disclosed herein.

The object of the disclosure is also solved by providing a method for producing a photochromic lens comprising the steps of:
arranging layers (a) to (e) in succession or in a layer sequence (a) to (e) in order to provide a
laminated film, and
applying an optical lens material to that the laminated film to provide the optical lens material substantially incorporating the laminated film. The laminated film has at least five layers. Typically, the laminated film is a five-layered laminated film.

Exemplary embodiments of the method are specified below.

According to the disclosure, the terms "photochromic" and "photochromatic" have the same meaning and can be used interchangeably. According to DIN EN ISO 13666:2013-10, section 6.4, a photochromic material or a photochromatic material (deprecated) is a material which reversibly changes its luminous transmittance characteristics depending upon the intensity and wavelength of the radiation falling upon it.

According to the disclosure, the term "optical lens" typically relates to an ophthalmic lens, i.e., according to DIN EN ISO 13666:2013-10, section 8.1.1, a lens intended to be used for purposes of measurement, correction, and/or protection of the eye, or for changing its appearance or to an optical lens to be mounted in a spectacle frame, i.e., a spectacle lens which is according to DIN EN ISO 13666:2013-10, section 8.1.2, defined as an ophthalmic lens worn in front of, but not in contact with, the eyeball, or a spectacle glass. According to another exemplary embodiment of the disclosure, the term "optical lens" does not relate to a lens of a photographic camera or a telescope or a microscope or binoculars. According to another exemplary embodiment of the disclosure the term "optical lens" does not relate to an intraocular lens or a contact lens.

According to the disclosure, the optical lens is most typically a photochromic lens which is defined in accordance with DIN EN ISO 13666:2013-10, section 8.1.11, as a lens which reversibly changes its luminous transmittance characteristics depending upon the intensity and wavelength of the radiation falling upon it.

According to the disclosure, the optical lens, typically the photochromic lens, is further typically a finished lens, i.e., according to DIN EN ISO 13666:2013-10, section 8.4.6, a lens of which both sides have their final optical surface. The optical lens may be either an uncut lens or an uncut finished spectacle lens, respectively, i.e., according to DIN EN ISO 13666:2013-10, section 8.4.7, a lens of which both sides are optically finished prior to edging or an edged lens, i.e., according to DIN EN ISO 13666:2013-10, section 8.4.8, a finished lens edged to the final size and shape.

According to the disclosure, the optical lens, typically the photochromic lens, is further typically a single-vision lens, i.e., according to DIN EN ISO 13666:20013-10, section 8.3.1, a lens designed to provide a single dioptric power, a multifocal lens, i.e., according to DIN EN ISO 13666:2013-10, section 8.3.2, a lens designed to provide two or more visibly divided portions of different focal powers, a bifocal lens, i.e., according to DIN EN ISO 13666:2013-10, section 8.3.3, a multifocal lens having two portions, usually for distance and near vision, a trifocal lens, i.e., according to DIN EN ISO 13666:2013-10, section 8.3.4, a multifocal lens having three portions, usually for distance, intermediate and near vision, a progressive-power lens, i.e., according to DIN EN ISO 13666:2013-10, section 8.3.5, a lens with at least one progressive surface, that provides increasing (positive) addition power as the wearer looks down or a degressive-power lens, i.e., according to DIN EN ISO 13666:2013-10, section 8.3.6, a lens with at least one progressive surface, that provides decreasing power (i.e., a negative change of power) as the wearer looks up.

According to the disclosure, the optical lens, typically the photochromic lens, may also be a lens blank, i.e., according to DIN EN ISO 13666:2013-10, section 8.4.1, a piece of material, usually preformed, for the making of a lens at any stage before completion of the surfacing processes, a semi-finished lens blank, i.e., according to DIN EN ISO 13666:2013-10, section 8.4.2, a lens blank having only one optically finished surface, a single-vision semi-finished lens blank, i.e., according to DIN EN ISO 13666:2013-10, section 8.4.3, a semi-finished lens blank which, after surfacing, is designed to provide a lens with a single dioptric power, a multifocal semi-finished lens blank, i.e., according to DIN EN ISO 13666:2013-10, section 8.4.4, a semi-finished lens blank which, after surfacing, is designed to provide a lens with two or more visibly divided portions of different dioptric powers, a progressive-power semi-finished lens blank, progressive-addition semi-finished lens blank or varifocal semi-finished lens blank, respectively, i.e., according to DIN EN ISO 13666:2013-10, section 8.4.5, a semi-finished lens blank which, after surfacing, is designed to provide a continuous change of dioptric power over a part or all of the lens. The lens blanks mentioned before may have a circular circumferential shape having typically a diameter between 40 mm and 100 mm.

According to the disclosure, the optical lens, typically the photochromic lens, may be a corrective lens, i.e., according to DIN EN ISO 13666:2013-10, section 8.1.3, a spectacle lens with dioptric power or an afocal lens or plano lens respectively, i.e., according to DIN EN ISO 13666:2013-10, section 8.2.3, a lens with nominally zero dioptric power.

According to the disclosure, the term "optical lens body" means the polymerized optical lens material used to manufacture the optical lens, typically the photochromic lens. The material of the optical lens body incorporates the laminated film comprising at least layers (a) to (e) or consisting of layers (a) to (e). Phrased differently, the term "optical lens body" means the optical lens without the incorporated laminated film. The lens body as well as the optical lens, typically photochromic lens, of the disclosure can be designed to be, for example, of a single vision type, bifocal type, trifocal type, progressive type, multifocal type, adjustable focus type, or plano type.

According to the disclosure, the term "optical lens material" means a material usable to manufacture a spectacle lens and to be usable as an optical lens body of the inventive photochromic lens incorporating the laminated film.

According to the disclosure, the term "laminated film" means a multilayered film comprising at least one photochromic layer. In particular, the laminated film is a five layered film comprising the layer sequence adhesive layer (a)/barrier layer (b)/photochromic layer (c)/barrier layer (d)/adhesive layer (e).

According to the disclosure, the term "barrier layer" means that this layer represents a barrier against reactive compounds, such as polymerizable monomer(s) or reactive species in order to protect the photochromic dye(s) in the photochromic layer. That is to say, the barrier layer prevents a diffusion of reactive compounds, such as polymerizable monomer(s) and/or of other reactive species, such as, starter compounds, e.g., photoinitiators, etc., into the photochromic layer. The barrier layer may also be described as "protective layer." Thus, the barrier layer(s) protect(s) the photochromic layer, in particular the photochromic dye(s), against the material(s) used to produce, in particular to cast, the optical lens body. These materials are by nature very reactive and, thus, aggressive against the photochromic dye(s). Moreover, the barrier layer(s) also protect the photochromic layer, in particular the photochromic dye(s), against the adhesive(s) used in the adhesive layer(s). The adhesive(s) can also be reactive with the photochromic layer, in particular the photochromic dye(s). In the laminated film, the at least one barrier layer may be arranged directly adjacent to the at least one photochromic layer. Alternatively, at least one further layer may be arranged between the at least one barrier layer and the at least one photochromic layer. Typically, in the laminated film, the at least one photochromic layer is sandwiched between two barrier layers. These two barrier layers may be identical or different with respect to their chemical composition and/or their layer thickness. Typically, these two barrier layers are identical with respect to their chemical composition and/or their layer thickness. Further typically, in the laminated film, the at least one barrier layer is arranged directly adjacent to the at least one photochromic layer.

According to the disclosure, the "photochromic layer" is a layer containing at least one photochromic dye. In an exemplary embodiment of the disclosure the photochromic layer may contain only one photochromic dye. According to another exemplary embodiment of the disclosure, the photochromic layer may contain a mixture of two or three different photochromic dyes. Of course, the photochromic layer may also contain more than three photochromic dyes, such as, for example, four to six photochromic dyes. Typically, the laminated film comprises at least one photochromic layer. In case the laminated film comprises at least two photochromic layers, those two photochromic layers may be identical or different with respect to the at least one photochromic dye, their chemical composition and/or their layer thickness. In the laminated film, those two photochromic layers are typically separated by at least one barrier layer and arranged between two further barrier layers, the barrier layers being identical, typically identical, or different with respect to their chemical composition and/or their layer thickness.

According to an exemplary embodiment, the photochromic dye(s) are not chemically reacted with other chemical species in the photochromic layer. Typically, the photochromic layer is comprised of a substrate layer containing the photochromic dye(s), wherein typically the photochromic dye(s) are not chemically reacted with and/or not chemically bonded to the substrate layer. According to another exemplary embodiment of the disclosure, the photochromic dye(s) are typically physically retained, typically only physically retained, in and/or on the substrate layer. Thus, the photochromic dye(s) are typically not chemically reacted within the substrate layer of the photochromic layer and typically also not reacted at the interfaces between photochromic layer and barrier layer(s) or another directly adjacent layer to the photochromic layer.

The photochromic layer can be produced by a cast process, using, for example, a rotary drum or strip casting equipment. In a first step, typically the compounds making up the substrate layer of the photochromic layer are dissolved or solubilized in a solvent, typically an organic solvent, which can optionally also contain water. Simultaneously or typically subsequently, the photochromic dye(s) is/are added to the solved substrate compounds. The photochromic dye(s) can be added in a solubilized state. The thus obtained solution can then be cast in a second step into a film, using, for example, a film casting device, which can be, for example, a rotary drum or strip casting device.

The at least one photochromic layer has typically a layer thickness within a range of 80 µm to 320 µm, typically of 120 µm to 280 µm, and more typically from 160 µm to 240 µm. In case the laminated film comprises at least two photochromic layers, the before mentioned values apply accordingly for each photochromic layer.

According to the disclosure, in the laminated film, the barrier layers (b) and (d) are arranged over both surfaces of the photochromic layer (c) or are directly applied on both surfaces of the photochromic layer (c). According to an exemplary embodiment of the disclosure, a barrier layer is directly applied on each of the two sides of the photochromic layer. The two sides of the photochromic layer are the upper surface and the lower surface of the photochromic layer, which are intended to be incorporated into the optical lens body to have the upper surface directed to the front surface and the lower surface directed to the back surface of the photochromic lens or vice versa. The upper surface and the lower surface of the photochromic layer are the two sides of the photochromic layer with the largest surface, respectively, not the sides of the photochromic layer. Typically, the barrier layer(s) and the photochromic layer are in direct physical contact. Thus, the photochromic layer is protected against any detrimental impact of reactive or aggressive chemicals, such as reactive monomers, starter compounds, etc., especially when producing, in particular casting, the optical lens, typically photochromic lens.

The barrier layers (b) and (d) can be applied by laminating the barrier layer(s) onto the photochromic layer (c). For example, the barrier layer can be produced separately by casting and, typically curing, a barrier film or barrier layer.

The barrier layer, which can also be designated as barrier foil, can be produced by extrusion, blow molding, or calendering.

The, typically cured or dried, barrier film or barrier layer can subsequently be laminated, typically directly laminated or fused or adhesively bonded, on both sides of the photochromic layer. Particularly, the, typically cured or dried, barrier layer is directly laminated completely on each of the supper surface and on the lower surface of the photochromic layer. By laminating the, typically cured or dried, barrier layer to each of the upper surface and lower surface of the photochromic layer, the photochromic dye(s) are not exposed to reactive or aggressive chemical compounds, e.g., initiators, such as benzoyl peroxide, di-t-butyl peroxide, diisopropyl peroxy dicarbonate, methyl ethyl ketone peroxide, acetylacetone peroxide, dibenzoyl peroxide, cumyl hydroperoxide, tert-butyl hydroperoxide, neither within the photochromic layer nor at the interface to the barrier layer(s) and/or any other layer directly adjacent to the photochromic layer.

Each barrier layer has typically a layer thickness within a range of 10 µm to 200 µm, more typically of 80 µm to 190 µm, even more typically from 120 to 180 µm.

The adhesive layers (a) and (e) are arranged or applied over both surfaces of the barrier layers (b) and (d) or directly arranged or applied to both surfaces of the barrier layer(s) (b) and (d), both surfaces of the barrier layers (b) and (d) being not next or not adjacent to the photochromic layer. The adhesive layer(s) (a) and (e) serve to provide a stable bonding to the lens material in the optical lens body.

The adhesive layer(s) (a) and (e) can be applied by laminating or coating, for example by spin coating, the adhesive layer(s) onto the surface of the barrier layer(s) which is/are intended to be incorporated in direct contact to the optical lens body.

For example, the adhesive layer(s) (a) and (e) can be tape casted on the barrier layer(s), and then dried. Alternatively, the adhesive layer(s) can be produced separately by casting or extruding, typically curing, and then laminating to the surface of the barrier layer(s), each surface of the barrier layer(s) not being next or adjacent to the photochromic layer.

The coating can be carried out, for example, by spraying or coating, for example by spin coating technology, a solution containing the compounds of the adhesive layer on both surfaces of the barrier layers which are in the layer sequence (a) to (e) of the laminated film not adjacent to the photochromic layer (c). Optionally, the solvent, typically an organic solvent, can be vaporized to provide the adhesive layer.

Each adhesive layer typically has a layer thickness within a range of 2 µm to 120 µm. The adhesive layer can be a pressure sensitive layer.

The inventors have found a unique solution, so that advantageously the photochromic dye(s) are not exposed to a chemically aggressive surrounding when providing and producing a photochromic lens. This approach allows using any photochromic dye or any mixture of photochromic dyes independently of the fact, whether or not the used photochromic dye(s) are compatible with or sensitive to reactive or aggressive chemicals, such as, polymerizable monomer(s), polymerizable prepolymers, and/or starter compounds, such as peroxides and photoinitiators, etc., used for producing the polymeric lens material of the optical lens body. That is to say, the present disclosure even allows to use very sensitive photochromic dye(s) which would be damaged or destroyed by polymerizable monomer(s) during the manufacture of an optical lens, such as, a lens casting polymerization, for example in an injection molding process. The laminated film comprising or consisting of layers (a) to (e), can be arranged in an optical lens mold, into which the optical lens material can be filled, for example, injected or pumped, so that the laminated film, containing or consisting of layers (a) to (e), is substantially incorporated, typically completely incorporated, within the optical lens body.

According to an exemplary embodiment of the disclosure, the laminated film, containing or consisting of the five layers (a) to (e), has a symmetrical structure.

Thus, the barrier layers (b) and (d) typically each have an identical chemical composition and typically also an identical layer thickness, within the usual fabrication tolerances.

Moreover, the adhesive layers (a) and (e) typically each have an identical chemical composition and typically also an identical layer thickness, within the usual fabrication tolerances.

According to another exemplary embodiment of the disclosure at least one additional layer is arranged at least between layer (a) and (b); layer (b) and (c); layer (c) and (d); and/or layer (d) and (e).

For example, according to an exemplary embodiment of the disclosure, one or more additional optical layers may be arranged between layer (a) and (b); layer (b) and (c); layer (c) and (d); and/or layer (d) and (e). For example, the at least one additional optical layer may be selected from the group consisting of a polarization layer, UV protection layer, coloration layer, mechanical stabilization layer, and combinations thereof.

According to another exemplary embodiment of the disclosure, a UV protection layer is arranged between layer (b) and (c) and a UV protection layer is arranged between layer (c) and (d). These two UV protection layers may be identical or different with respect to their chemical composition and/or their layer thickness. According to another exemplary embodiment of the disclosure a UV protection layer is arranged between layer (b) and (c).

According to another exemplary embodiment of the disclosure, layers (a) to (e) are arranged in succession and directly on each other, typically in physical contact to each other. In this exemplary embodiment of the disclosure the laminated film consists of adhesive layer (a), barrier layer (b), photochromic layer (c), barrier layer (d), and adhesive layer (e). Thus, typically photochromic layer (c) is directly arranged between the two barrier layers (b) and (d), respectively, so that barrier layer (b) and barrier layer (d) are in physical contact with photochromic layer (c). Each of the two barrier layers (b) and (d) is typically directly provided with the adhesive layer (a) and (e), respectively, on the side of each barrier layer (b) and (d), respectively, opposite to photochromic layer (c). Thus, adhesive layer (a) is in physical contact with barrier layer (b); and adhesive layer (e) is in physical contact with layer barrier (d). Consequently, in an exemplary embodiment of the disclosure, layers (a) to (e) are arranged in succession or in a layer sequence, wherein the layers are in physical contact with each other in the indicated order.

According to another exemplary embodiment of the disclosure, the adhesive layer(s) comprises or consists of compound(s) selected from the group consisting of epoxy monomer, acrylate monomer, acrylate oligomer, polyurethane, polyepoxy, polyacrylate, polymethacrylate, polyvinyl alcohol (PVA), polyvinyl formal (PVF), polyvinyl acetate (PVAc), saponified (ethylene, vinyl acetate) copolymer, silicone, natural and/or synthetic rubber, styrene block copolymers, and mixtures thereof, and optionally one or more solvent(s), typically organic solvent(s).

According an exemplary embodiment of the disclosure, the adhesive layer(s) comprises or consists of compound(s) selected from the group consisting of acrylate monomer, acrylate oligomer, and mixtures thereof, and optionally one or more solvent(s), typically organic solvent(s).

The solvent(s) is/are typically organic solvent(s), more typically volatile organic solvent(s). Particular useful organic solvents are ethanol, ethyl acetate, and mixtures thereof.

According to an exemplary embodiment of the disclosure, the adhesive layer(s) comprises or consists of acrylate monomer, acrylate oligomer, or mixtures thereof and further comprises or consists of organic solvent(s) of ethanol, ethyl acetate, or mixtures thereof.

According to an exemplary embodiment of the disclosure, the barrier layer comprises or consists of a polymeric film.

According to an exemplary embodiment of the disclosure, the barrier layer(s) comprise(s) or consist(s) of compounds selected from the group consisting of cellulose based polymers, such as diacetylcellulose and triacetyl cellulose (TAC), cellulose acetate butyrate (CAB); polycarbonate (PC) based polymer; polyester based polymers, such as polyethyleneterephthalate (PET), polyethyleneterephthalate glycol (PETG), polyethylene naphthenate, and dimethyl terephthalate (DMT); acrylate based polymers, such as polymethacrylate (PMA), polyethylacrylate; methacrylate polymers, such as polymethyl methacrylate (PMMA), polyethyl methylacrylate; thermoplastic urethane polymers (TPU); polythiourethane based polymers; vinyl based polymers, such as polyvinyl chloride, polyvinyl alcohol, polyvinylidene chloride, polyvinyl butyral; styrene based polymers, such as polystyrene, styrene methylmethacrylate copolymers (SMMA), styrene maleic anhydride polymers (SMA), acrylonitrile-styrene (ANS) copolymers, acrylonitrile butadiene styrene (ABS) terpolymers, (meth)acrylate butadiene styrene (MBS) terpolymers; olefin based polymers, such as polyethylene, polypropylene, polymethylpentene (PMP), cyclic (COC) or norbornene structure-containing polyolefins, and ethylene-propylene copolymers; amide based polymers, such as nylon and aromatic polyamide; imide based polymers; polyether imide based polymers; polysulfone based polymers; polyether sulfone based polymers; polyether ether ketone based polymers; polyphenylene sulfide based polymers; polyoxymethylene based polymers; and epoxy based polymers, and any blend or mixture thereof.

According to an exemplary embodiment, the barrier layer(s) comprise(s) or consist(s) of compounds selected from the group consisting of cellulose triacetate (TAC), polycarbonate (PC), cellulose acetate butyrate (CAB), poly (methyl methacrylate) PMMA, poly(ethylene terephthalate) (PET), and mixtures thereof. TAC, PET and PC are typical compounds, with TAC being most typical as barrier layer.

According to another exemplary embodiment of the disclosure, the barrier layer(s) can provide additional optical functions. These optical functions are typically selected from the group consisting of UV protection, light polarization, typically linear light polarization, base coloration, and combinations thereof. Typically, the barrier layer(s) has/have a UV protection function.

According to another exemplary embodiment of the disclosure, the barrier layer contains permanent dye(s) as described further below.

According to an exemplary embodiment of the disclosure, the photochromic layer comprises at least one photochromic dye. The photochromic layer may comprise a mixture of two or three photochromic dyes. The photochromic dye(s) can be combined so that, for example, by color mixing, any desired photochromic color can be produced. It is, however, also within the scope of this disclosure to incorporate more than three photochromic dye(s) in the photochromic layer, for example, four to six photochromic dye(s).

Typically, the at least one photochromic dye is selected from the group consisting of naphthopyrans, spironaphthopyrans, oxazines, spironaphthoxazines, benzopyrans, spirobenzoxzines, spirobenzopyrans, spiropyrans, chromenes, fulgides, fulgimides, spirooxazines, organometal dithiozonates, triarylmethanes, stilbenes, azastilbenes, nitrones, quinones, and mixtures thereof.

According to another exemplary embodiment of the disclosure, the at least one photochromic dye is typically selected from the group consisting of naphthopyrans, spironaphthopyrans, oxazines, spironaphthoxazines, benzopyrans, spirobenzoxazines, spirobenzopyrans, spiropyrans, chromenes, fulgides, fulgimides, spirooxazines, organometal dithiozonates, and mixtures thereof.

According to another exemplary embodiment of the disclosure, the at least one photochromic dye is typically selected from the group consisting of benzopyrans, naphthopyrans, spirobenzopyrans, spironaphthopyrans, spirobenzoxazines, spironaphthoxazines, fulgides, fulgimides, and mixtures thereof. Typically, naphthopyrans and/or spironaphthopyrans are used as photochromic dyes.

According to another exemplary embodiment of the disclosure the photochromic dye(s) are selected from the group consisting of:

1,3-dihydrospiro[2H-anthra[2,3-d]imidazole-2,1'-cyclohexane]-5,10-dione;

1,3-dihydrospiro[2H-anthra[2,3-d]imidazole-2,1'-cyclohexane]-6,11-dione;

1,3-dihydro-4-(phenylthio)spiro[2H-anthra-1',2-diimidazole-2,1'-cyclohexane]-6,11-dione;

1,3-dihydrospiro[2-H-anthra[1,2-d]imidazole-2,1'-cycloheptane]-6,11-dione-1,3,3-trimethylspiroindole-2,3'[3H]naphtho[2,1-b]-1,4-oxazine]2-methyl-3,3'-spiro-bi-[3H-naphtho[2,1-bipyran](2-Me);

2-phenyl-3-methyl-7-methoxy-8'-nitrospiro[4H]-1-benzopyran-4,3'-[3H]-naphtho[2,1-bipyran];

spiro[2H-1-benzopyran-2,9'-xanthene];

8-methoxy-1',3'-dimethylspiro(2H-1-benzopyran-2,2'-(1'H)-quinoline;

2,2'-spiro-bi-[2H-1-benzopyran];

5'-amino-1',3',3'-trimethylspiro[2H-1-benzopyran-2,2'-indoline;

ethyl-beta-methyl-beta-(3',3'-dimethyl-6-nitrospiro(2H-1-benzopyran-2,2'-indolin-1'-yl))-propenoate;

(1,3-propanediyl)bis[3',3'-dimethyl-6-nitrospiro[2H-1-benzopyran-2,2'-indoline]];

3,3'-dimethyl-6-nitrospiro[2H-1-benzopyrao-2,2'-benzoxazoline];

6'-methylthio-3,3'-dimethyl-8-methoxy-6-nitrospiro[2H-1-benzopyran-2,2'-benzothiozoline];

(1,2-ethanediyl)bis[8-methoxy-3-methyl-6-nitrospiro[2H-1-b enzopyran-2,2'-benzothiozoline]];

N—N'-bis(3,3'-dimethyl-6-nitrospiro[2H-1-benzopyran-2,2' (3'H)-benzothioazol-6'-yl)decanediamide];

alpha-(2,5-dimethyl-3-furyl)ethylidene(Z)-ethylidenesuc-cinicanhydride;
alpha-(2,5-dimethyl-3-furyl)-alpha'-delta-dimethylfulgide;
2,5-diphenyl-4-(2'-chlorophenyl)imidazole;
(2',4'-dinitrophenyl)methyl-1H-benzimidazole;
N—N-diethyl-2-phenyl-2H-phenanthro[9,10-d]imidazol-2-amine;
2-nitro-3-aminofluoren-2-amino-4-(2'-furanyl)-6H-1,3-thiazine-6-thione, or mixtures thereof.

According to another exemplary embodiment of the disclosure, the photochromic dye(s) can be selected from the group consisting of: REVERSACOL Midnight Gray, REVERSACOL Pacific Blue, REVERSACOL Sunflower, REVERSACOL Corn Yellow (James Robinson, Ltd., Huddersfield, England), or mixtures thereof.

Typically, the photochromic dye(s) is/are present in an amount of 0.001 to 0.5 wt.-%, typically of 0.01 to 0.1 wt.-%, based on the total weight of the photochromic layer. In case, the laminated film comprises at least two photochromic layers, the before mentioned values for the photochromic dye(s) apply to each the photochromic dye(s) in each photochromic layer.

According to an exemplary embodiment of the disclosure, the photochromic layer comprises cellulose ester. The cellulose ester typically forms the substrate layer of the photochromic layer. The photochromic dye(s) is/are incorporated into the cellulose substrate layer. The photochromic dye(s) are non-covalently retained in the cellulose substrate layer.

Typically, the cellulose ester is selected from the group consisting of cellulose acetate, cellulose acetate butyrate, cellulose acetate propionate, or mixtures thereof. Also typically, the cellulose acetate is selected from the group consisting of cellulose diacetate, cellulose triacetate, and mixtures thereof. According to another exemplary embodiment of the disclosure, the cellulose ester is cellulose triacetate.

Cellulose ester, in particular cellulose acetate, further in particular, cellulose triacetate, can be readily solubilized in an organic solvent. After having solubilized the cellulose ester, typically cellulose triacetate, at least one photochromic dye is added to the solution. If desired, further additive(s) may be added. The obtained solution can then be cast and dried to produce the photochromic layer or film.

A process to produce highly transparent films or layers on the basis of cellulose ester(s) containing photochromic dye(s) is disclosed in WO 2016/134688 A1, the disclosure of which is incorporated herewith by reference. The photochromic dye(s) is/are retained in the produced layer, typically only, by physical interaction, for example, by caging or trapping the photochromic dye(s) in the structure of the cellulose ester layer or film.

According to another exemplary embodiment of the disclosure the substrate layer, typically cellulose ester, in particular cellulose acetate, further in particular, cellulose triacetate, used for the manufacture of the photochromic layer, can be provided with photochromic dye(s) by dipping the substrate layer into a solution containing the photochromic dye(s). Thus, the substrate layer, typically cellulose ester, in particular cellulose acetate, further in particular, cellulose triacetate, can imbibe the photochromic dye(s). The concentration of the photochromic dye(s) in the substrate layer can be controlled by the dipping time.

According to an exemplary embodiment, the optical lens body comprises or consists of organic glass. The organic glass can also be specified as plastic glass. According to an exemplary embodiment the optical lens or optical lens body is not made of or based on inorganic glass or mineral glass.

Typically, the organic glass comprises or consists of a polymeric material selected from the group consisting of polythiourethane, polyepisulphide, polymethyl methacrylate, polycarbonate, polyallyldiglycolcarbonate, polyacrylate, polyurethane, polyurea, polyamide, polysulphone, polyallyl, fumaric acid polymer, polystyrene, polymethyl acrylate, biopolymers, and mixtures and combinations thereof. An organic lens or optical lens body is typically made of one of the polymeric materials mentioned above or a mixture or combination thereof.

In another exemplary embodiment of the disclosure, the organic lens substrate comprises or consists of a polymeric material selected from the group consisting of polythiourethane, polyepisulfide, polymethyl methacrylate, polycarbonate, polyallyldiglycolcarbonate, polyacrylate, polyurethane, polyurea, polyamide, polysulfone, polyallyl, fumaric acid polymer, polystyrene, polymethyl acrylate, biopolymers, and mixtures and combinations thereof.

In another exemplary embodiment of the disclosure, the organic glass or optical lens body comprises or consists of a polymeric material selected from the group consisting of polyurethane, polyurea, polythiourethane, polyepisulfide, polycarbonate, polyallyldiglycolcarbonate, and mixtures and combinations thereof, which are typically used with a laminated film comprising or consisting of layers (a) to (e), wherein layer (c) comprises as substrate typically cellulose ester, in particular cellulose acetate, most typically, cellulose triacetate.

Polyallyldiglycolcarbonate has proven to be a very suitable polymeric material as organic glass substrate. Polyallyldiglycolcarbonate is typically used with a laminated film comprising or consisting of layers (a) to (e), wherein layer (c) comprises as substrate typically cellulose ester, in particular cellulose acetate, most typically, cellulose triacetate.

The polymeric materials available under the trade names MR6, MR7, MR8, MR10, MR20, MR174, CR39, CR330, CR607, CR630, RAV700, RAV7NG, RAV7AT, RAV710, RAV713, RAV720, Trivex, Panlite, MGC 1.76, RAVolution have also proven to be very suitable as organic glass material.

The base material of CR39, CR330, CR607, CR630, RAV700, RAV7NG, RAV7AT, RAV710, RAV713, and RAV720 is polyallyldiglycolcarbonate. The base material of RAVolution, and Trivex is polyurea/polyurethane. The base material of MR6, MR7, MR8, and MR10 is polythiourethane. The base material of MR 174, and MGC 1.76 is polyepisulfide.

These organic glass materials are typically used with a laminated film comprising or consisting of layers (a) to (e), wherein layer (c) comprises as substrate typically cellulose ester, in particular cellulose acetate, most typically, cellulose triacetate.

The polymeric material available under the designations CR39, MR7, MR8 are very typically used as organic glass materials according to the disclosure. These organic glass materials are typically used with a laminated film comprising or consisting of layers (a) to (e), wherein layer (c) comprises as substrate typically cellulose ester, in particular cellulose acetate, most typically, cellulose triacetate.

The organic glass or plastic lens material can be clear, UV tinted or gradient UV tinted, solid tinted or permanently colored, or can have a permanent color gradient. This at least one additional color can be provided by at least one permanent dye. The permanent dye(s) can be contained in the optical lens body and/or the barrier layer.

According to an exemplary embodiment of the disclosure, the barrier layer contains permanent dye(s). The permanent dye(s) can be selected for from the group consisting of C.I. Disperse Yellow 5, C.I. Disperse Yellow 13, C.I. Disperse Yellow 33, C.I. Disperse Yellow 42, C.I. Disperse Yellow 51, C.I. Disperse Yellow 54, C.I. Disperse Yellow 64, C.I. Disperse Yellow 71, C.I. Disperse Yellow 86, C.I. Disperse Yellow 114, C.I. Disperse Yellow 201, C.I. Disperse Yellow 211, C.I. Disperse Orange 30, C.I. Disperse Orange 73, C.I. Disperse Red 4, C.I. Disperse Red 11, 5 C.I. Disperse Red 15, C.I. Disperse Red 54, C.I. Disperse Red 55, C.I. Disperse Red 58, C.I. Disperse Red 60, C.I. Disperse Red 73, C.I. Disperse Red 86, C.I. Disperse Red 91, C.I. Disperse Red 92, C.I. Disperse Red 127, C.I. Disperse Red 152, C.I. Disperse Red 189, C.I. Disperse Red 229, C.I. Disperse Red 279, C.I. Disperse Red 302, C.I. Disperse Red 302:1, C.I. Disperse Red 323, C.I. Disperse Blue 27, C.I. Disperse Blue 54, C.I. Disperse Blue 56, C.I. Disperse Blue 73, C.I. Disperse Blue 280, C.I. Disperse Violet 26, C.I. Disperse Violet 33, C.I. Solvent Yellow 179, C.I. Solvent Violet 36, C.I. Pigment Blue 15, C.I. Pigment Blue 80, C.I. Pigment Green 7, C.I. Pigment Orange 36, C.I. Pigment Orange 36, C.I. Pigment Yellow 13, C.I. Pigment Violet 23, C.I. Pigment Violet 37, C.I. Pigment Black 1, C.I. Pigment Black 6, C.I. Pigment Black 7, and mixtures thereof.

The photochromic lens of the present disclosure typically has a refractive index in the range of 1.4 to 1.8, typically 1.45 to 1.78, further typically of 1.48 to 1.76. With particularity, the refractive indices are 1.5; 1.56; 1.6; 1.67; or 1.74. The refraction index is based on the sodium D-line (589 nm).

The spectacle frame of the present disclosure comprises an optical lens, typically a photochromic lens as disclosed herein.

The method for producing a photochromic lens disclosed herein comprises the steps of arranging layers (a) to (e) in succession or in a layer sequence in order to provide a laminated film, applying an optical lens material to that the laminated film to provide the photochromic lens substantially incorporating, typically completely incorporating, the laminated film.

The optical lens body can be provided in the form of a semi-finished product. The semi-finished product can be in the form of a separate front part as well as a separate back part of a spectacle lens. The separate front part and the separate back part of the optical lens body can be combined by adhering to the adhesive layers (a) and (e), respectively, of the laminated film comprising or consisting of layers (a) to (e). The combined front part, laminated film, comprising or consisting of layers (a) to (e), and the back part provide the photochromic lens of the present disclosure.

According to an exemplary embodiment, the method further comprises the steps of arranging the laminated film in a casting mold for casting an optical lens, typically a spectacle lens, providing the casting mold with a liquid or molten optical lens material and substantially incorporating or encapsulating, typically incorporating or encapsulating, the laminated film within the liquid or molten optical lens material, and solidifying the liquid or molten optical lens material.

When arranging the laminated film in a casting mold, the step of arranging typically comprises a bending of the laminated film. Typically, the step of arranging the laminated film in a casting mold comprises a matching of the shape of the laminated film to the shape of the front surface of a mold, typically of an optical lens mold, more typically of an ophthalmic lens mold, more typically a spectacle lens mold.

The explanations provided above with respect to the photochromic lens apply respectively for the method of the present disclosure. Thus, the features of the photochromic lens as disclosed above are expressly disclosed in combination with the method of the disclosure by this reference.

The present disclosure typically also provides a method for producing a photochromic lens as described above, the process including the steps of
forming a laminated film including;
an adhesive layer (a),
a barrier layer (b),
a photochromic layer (c),
a barrier layer (d), and
an adhesive layer (e),
matching the shape of the laminated film to the shape of the front surface of an optical lens, typically a spectacle lens, by bending in order to provide a bent laminated film in an optical lens mold, typically a spectacle lens mold;
injecting a composition comprising liquid monomer(s) or mixture of monomers or polymerizable material into the optical lens mold, typically a spectacle lens mold, around the shaped or bent laminated film; and
curing or hardening the liquid monomer(s) or mixture of monomers or polymerizable material in order to obtain a photochromic lens wherein the laminated film is substantially, typically completely, incorporated within the optical lens body.

The monomer(s) or monomeric compound(s) are polymerized, typically using initiators or starter compounds or UV rays, during the curing or hardening in order to provide the organic glass or polymeric material specified above.

According to an exemplary embodiment, the shaped or bent laminated film is hold by means, typically a gasket, within the lens mold, typically close to the front surface.

According to another exemplary embodiment of the disclosure, the method for producing a photochromic lens as disclosed herein comprises the steps of:
arranging layers (a) to (e) in succession or in a layer sequence in order to provide a laminated film,
bending the film, typically in a press machine, typically with a specific curvature aluminum mold, typically under a temperature in a range of 80 to 95° C., typically under a temperature of 90° C.;
arranging the bent laminated film into an optical lens casting assembly, typically a spectacle lens casting assembly, for the mold, typically including two glass molds and gaskets,
wherein the bent laminated film is held with the gaskets;
injecting liquid monomeric compound(s), typically polyallyldiglycolcarbonate liquid monomer, into the lens casting assembly around the bent laminated film;
putting the lens casting assembly into an oven under temperature in a range of 40° C. to 90° C. for an appropriate time, typically of 6 to 12 hours, more typically 10 hours, to polymerize the monomeric compound(s), typically the polyallyldiglycolcarbonate liquid monomer; and
opening the assembly and taking out the solid photochromic lens.

Alternatively, an injection molding process can be used. The liquid or molten material, typically polymerizable material, is solidified, typically polymerized, in the casting mold. After having finished the solidification, typically polymerization, the obtained cast lens blank is removed from the mold.

Optionally, any necessary finishing steps, in particular prescription grinding, can additionally be carried out to produce the finished photochromic lens.

With particularity, the method of the present disclosure allows to process the front surface as well as the back surface of the obtained cast lens blank without damaging the photochromic layer. This is due to the fact that the photochromic layer, as part of the at least five layered laminated film, is arranged within the photochromic lens, i.e., not at a surface of the photochromic lens. Therefore, the surfaces of the obtained photochromic lens can be mechanical treated, for example, ground, and/or polished.

Moreover, the surface(s) of the thus obtained photochromic lens can be further coated, for example, with an anti-fog layer, an anti-static coating, a hydrophobic layer, an anti-reflective coating, a hard coating, and/or a polarization layer.

The disclosure is further illustrated by the exemplary embodiments and drawings. The disclosure, however, is not to be construed to be limited to enclosed examples.

BRIEF DESCRIPTION OF THE DRAWINGS

The disclosure will now be described with reference to the drawings wherein.

DESCRIPTION OF EXEMPLARY EMBODIMENTS

Figure 1:
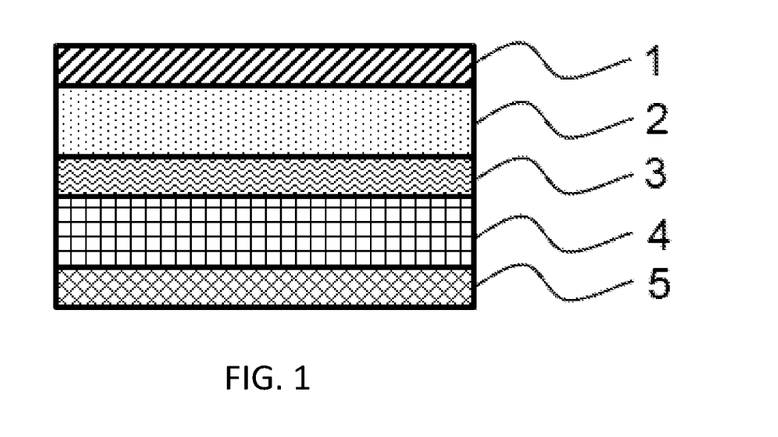
FIG. 1 shows a schematic view of a laminated film usable within the optical lens body to provide a photochromic lens of the disclosure.

FIG. 1 shows a laminated film consisting of five layers 1 to 5. Layers 1 to 5 each have a film-like appearance having two major sides, which can be designated as upper and lower side in the depiction of FIG. 1. The upper side of layer 5 is in physical contact with the lower side of layer 4. The upper side of layer 4 is in physical contact with the lower side of layer 3. The upper side of layer 3 is in physical contact with the lower side of layer 2. The upper side of layer 2 is in contact with the lower side of layer 1. The centrally arranged layer 3 is the photochromic layer (c). The layers 2 and 4 enclosing the photochromic layer (c) are the first barrier layer (b) and the second barrier layer (d), respectively. The first and second barrier layers (b) and (d) are in turn provided each with a first adhesive layer (a) and a second adhesive layer (e), respectively.

It is to be noted that the layers 2 and 4 can have an identical chemical composition or can have a different chemical composition. Moreover, the thickness of layers 2 and 4 can be identical or different from each other. Typically, layers 2 and 3 have an identical chemical composition and have an identical layer thickness.

It is further to be noted that the layers 1 and 5 can have an identical chemical composition or can have a different chemical composition. Moreover, the thickness of layers 1 and 5 can be identical or different from each other. Typically, layers 1 and 5 have an identical chemical composition and have an identical layer thickness.

According to an exemplary embodiment of the disclosure, the film laminate comprising or consisting of layers 1 to 5 has a symmetrical structure in particular regarding chemical composition and thickness of layers.

Figure 2:
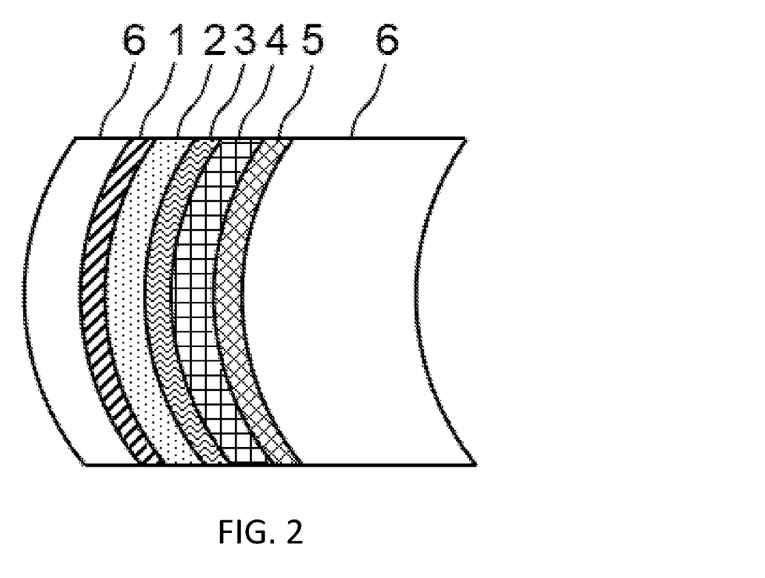
FIG. 2 shows a schematic view of the laminated film shown in FIG. 1 within an optical lens body.

FIG. 2 shows a section of the photochromic lens of the disclosure, wherein the laminated film of FIG. 1 is arranged within an optical lens body of the photochromic lens. The laminated film consisting of layers 1 to 5 is incorporated within the material 6 of the optical lens body.

Figure 3:
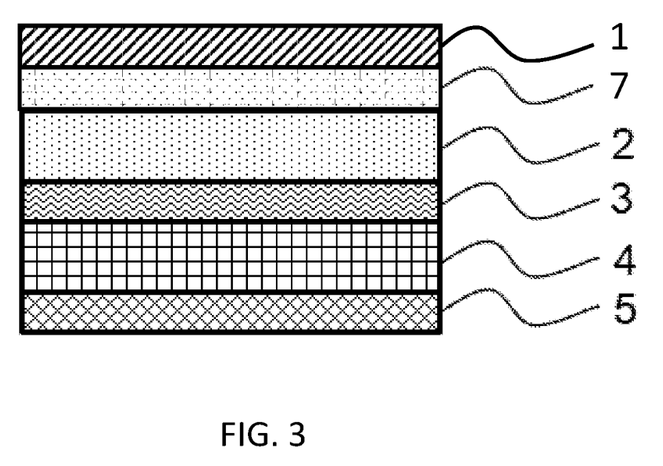
FIG. 3 shows a schematic view of a laminated film with an additional functional layer.

FIG. 3 shows an exemplary embodiment of the photochromic lens of the disclosure having an additional functional layer 7 between layers 1 and 2. However, more than one additional functional layers 7 may be present. Further, the additional functional layer or layers may be present between each of layers 1 and 2, layers 2 and 3, layers 3 and 4, or layers 4 and 5.

EXAMPLES

Example 1 According to the Disclosure 1000 g triacetyl cellulose (SICHUAN PUSH ACETATI CO., LTD) were solved in 4000 g dichloromethane at a temperature of 20° C. for 24 h. 0.5 g of 3,3-diphenyl-3H-naphtho[2,1-b]pyran (GANTIAN OPTIC CO., LTD) were added with stirring at a temperature of 20° C. for 48 hours. The obtained solution was cast into a photochromic layer using a tape casting production line. The organic solvent was vaporized by heating at 110° C. for 10 hours so that the obtained photochromic layer had a layer thickness of 180 μm.

The obtained photochromic layer was laminated on each of both major sides with a barrier layer of triacetyl cellulose (Island Polymer Industries GmbH) having each a thickness of 80 μm by lamination using SW-560 Automatic Laminator (GUANGMING PRINTING MACHINERY CO., LTD).

The thus obtained three layer film laminate was coated on both sides with an adhesive layer by spraying/coating using WS-65MZ-23NPPB Spin coater (Laurell Technologies Corporation). The adhesive layer formulation is specified in Table 1 below:

TABLE 1

| Components | | Weight (grams) |
|---|---|---|
| Vectomer ™ 2020 | Vinyl ether monomer made by Morflex | 8 |
| Epolight 100MF | Epoxy monomer made by Kyoeisha | 4 |
| CN962 | Acrylate made by SATAROMER | 10 |
| Cyacure 6974 | Cationic UV initiator from Union Carbide | 1 |
| Vicure 55 | Free radical UV initiator from AKZO | 1 |
| Isopropyl Alcohol | Solvent, alcohol | 22 |
| Methyl Isobutyl Ketone | Solvent, ketone | 54 |
| Total | | 100 |

The thus obtained five layered laminated film was placed in mold for casting spectacle
lenses by following steps:
the laminated film was bent in a press machine with an specific curvature aluminum mold, under the temperature of 90° C.;
the bent five layered laminated film was placed into a lens casting assembly for the mold, which includes two glass molds and gaskets;
the bent five layered laminated film was held with the gaskets;
polyallyldiglycolcarbonate liquid monomer was injected into the lens casting assembly around the bent photochromic film;

the lens casting assembly was put into an oven under a temperature range of 40° C. to 90° C. for 10 hours; the polyallyldiglycolcarbonate liquid monomer polymerized to solid lens; and the assembly was opened and the solid photochromic lens was taken out.

Comparative Example 1

The photochromic lens was produced in accordance with Example 1, with the exception that no barrier layers were applied to protect the photochromic layer. The adhesive layers was applied directly to the photochromic layer.

The three layered laminated film consisting of an adhesive layer/photochromic layer/adhesive layer structure, was used to produce a photochromic lens as described in Example 1.

Comparative Example 2

The photochromic lens was produced in accordance with Example 1, with the exception that no adhesive layers were applied to the barrier layers. The three layered laminated film, consisting of a barrier layer/photochromic layer/barrier layer, was used to produce a photochromic lens as described in Example 1.
Results

TABLE 2

| Lens | Initial Transmittance | Photochromic performance: Transmittance at darkened state | Adhesion test |
|---|---|---|---|
| Inventive Example 1 | 88% | 25% | Pass |
| Comparative Example 1 | 87.5% | 86.6% | Pass |
| Comparative Example 2 | 88% | 24.6% | Fail |

In Table 2, the transmittance at darkened stage is based on the test method in ISO 8980-3.

The adhesion test was performed by the following steps as set forth below:

Putting the lens into a groove machine (Brand: LIANGYOU, Type C); do the grooving on the lens sidewall, where the photochromic layer/laminated film is located according to the manufacturer's instructions;

Place the lens after grooving into the 3 opening wedges hold in place of an INSTRON 3360 material tester in accordance with the manufacturer's instructions wherein the wedges hold the position of the slotting area of the lens sidewall;

Starting test wherein the INSTRON material tester pulls the lens with 100N load for 5 minutes:

If there is a separation between the photochromic layer/laminated film and the optical lens body then the adhesion test is passed otherwise failed.

As can be seen from Table 2, only the photochromic lens containing the five-layered film passed the adhesion test and provided a significant reduction of light transmission down to 25%.

Particular aspects of the disclosure are specified below:

Aspect 1: An optical lens comprising a laminated film, the laminated film containing
an adhesive layer (a),
a barrier layer (b),
a photochromic layer (c),
a barrier layer (d), and
an adhesive layer (e),
wherein the layers (a) to (e) are arranged in succession or in a layer sequence and wherein the laminated film is substantially incorporated within an optical lens body.

Aspect 2: The optical lens according to aspect 1, wherein in the laminated film at least one additional layer is arranged at least between layer (a) and (b); layer (b) and (c); layer (c) and (d); and layer (d) and (e).

Aspect 3: The optical lens according to aspect 1 or 2, wherein in the laminated film layers (a) to (e) are arranged in succession or in a layer sequence and directly on each other.

Aspect 4: The optical lens according to any one of aspects 1 to 3, wherein the adhesive layer(s) comprises or consists of compound(s) selected from the group consisting of epoxy monomer, acrylate monomer, methacrylate monomer, acrylate oligomer, methacrylate oligomer, polyurethane, polyepoxy, polyacrylate, polymethacrylate, polyvinyl alcohol (PVA), polyvinyl formal (PVF), polyvinyl acetate (PVAc), saponified (ethylene, vinyl acetate) copolymer, silicone, natural and/or synthetic rubber, styrene block copolymers, and mixtures thereof.

Aspect 5: The optical lens according to any one of aspects 1 to 4, wherein the barrier layer(s) comprise or consists of compounds selected from the group consisting of cellulose based polymers, such as diacetylcellulose and triacetyl cellulose (TAC), cellulose acetate butyrate (CAB); polycarbonate (PC) based polymer; polyester based polymers, such as polyethyleneterephthalate (PET), polyethyleneterephthalate glycol (PETG), polyethylene naphthenate, and dimethyl terephthalate (DMT); acrylate based polymers, such as polymethacrylate (PMA), polyethylacrylate; methacrylate polymers, such as polymethyl methacrylate (PMMA), polyethyl methylacrylate; thermoplastic urethane polymers (TPU); polythiourethane based polymers; vinyl based polymers, such as polyvinyl chloride, polyvinyl alcohol, polyvinylidene chloride, polyvinyl butyral; styrene based polymers, such as polystyrene, styrene methylmethacrylate copolymers (SMMA), styrene maleic anhydride polymers (SMA), acrylonitrile-styrene (ANS) copolymers, acrylonitrile butadiene styrene (ABS) terpolymers, (meth)acrylate butadiene styrene (MBS) terpolymers; olefin based polymers, such as polyethylene, polypropylene, polymethylpentene (PMP), cyclic (COC) or norbornene structure-containing polyolefins, and ethylene-propylene copolymers; amide based polymers, such as nylon and aromatic polyamide; imide based polymers; polyether imide based polymers; polysulfone based polymers; polyether sulfone based polymers; polyether ether ketone based polymers; polyphenylene sulfide based polymers; polyoxymethylene based polymers; and epoxy based, polymers, or any blend thereof, typically cellulose triacetate (TAC), polycarbonate (PC), cellulose acetate butyrate (CAB), poly(methyl methacrylate) PMMA, poly(ethylene terephthalate) (PET), and mixtures thereof.

Aspect 6: The optical lens according to any one of aspects 1 to 5, wherein the barrier layer provides additional optical functions.

Aspect 7: The optical lens according to aspect 6, wherein the optical functions are selected from the group consisting of UV protection, light polarization, base coloration, and mixtures thereof.

Aspect 8: The optical lens according to any one of aspects 1 to 7, wherein the photochromic layer comprises at least one photochromic dye.

Aspect 9: The optical lens according to any one of aspect 8, wherein the at least one photochromic dye is selected from the group consisting of naphthopyrans, spironaphthopyrans, oxazines, spironaphthoxazines, benzopyrans, spirobenzoxzines, spirobenzopyrans, spiropyrans, chromenes, fulgides, fulgimides, spirooxazines, organo-metal dithiozonates, triarylmethanes, stilbenes, azastilbenes, nitrones, quinones, and mixtures thereof.

Aspect 10: The optical lens according to any one of aspects 1 to 9, wherein the photochromic layer comprises cellulose ester.

Aspect 11: The optical lens according to any one of aspects 1 to 10, wherein the lens body comprises or consists of organic glass.

Aspect 12: The optical lens according to aspect 10, wherein the organic glass comprises or consists of a polymeric material selected from the group consisting of polythiourethane, polyepisulphide, polymethyl methacrylate, polycarbonate, polyallyldiglycolcarbonate, polyacrylate, polyurethane, polyurea, polyamide, polysulphone, polyallyl, fumaric acid polymer, polystyrene, polymethyl acrylate, biopolymers, and mixtures and combinations thereof.

Aspect 13: A spectacle comprising an optical lens according to any one of aspects 1 to 12.

Aspect 14: A method for producing an optical lens according to any one of aspects 1 to 12, comprising the steps of:

arranging layers (a) to (e) in succession or in a layer sequence in order to provide a laminated film, applying an optical lens material to that the laminated film to provide the optical lens substantially incorporating the laminated film.

Aspect 15: The method according to aspect 14, further comprising the steps of arranging the laminated film in a casting mold for casting an optical lens, providing the casting mold with a liquid or molten optical lens material and substantially incorporating or encapsulating the laminated film within the liquid or molten optical lens material, and solidifying the liquid or molten optical lens material.

Aspect 16: A method for producing an optical lens according to any one of aspects 1 to 12 comprises the steps of:

arranging layers (a) to (e) in succession or in a layer sequence in order to provide a laminated film, bending the film, typically in a press machine, typically with a specific curvature aluminum mold, typically under a temperature in a range of 80 to 95° C., typically under a temperature of 90° C.;

arranging the bent laminated film into an optical lens casting assembly for the mold, typically including two glass molds and gaskets;

wherein the bent laminated film is held with the gaskets;

injecting liquid monomeric compound(s), typically polyallyldiglycolcarbonate liquid monomer, into the lens casting assembly around the bent laminated film;

putting the lens casting assembly into an oven under temperature in a range of 40° C. to 90° C. for an appropriate time, typically of 6 to 12 hours, typically 10 hours; to polymerize the monomeric compound(s), typically the polyallyldiglycolcarbonate liquid monomer, opening the assembly and taking out the solid optical lens.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A photochromic lens having a laminated film, the laminated film consisting of:
   a first adhesive layer;
   a first barrier layer;
   a photochromic layer;
   a second barrier layer; and
   a second adhesive layer;
   wherein the first adhesive layer, the first barrier layer, the photochromic layer, the second barrier layer, and the second adhesive layer are arranged in succession,
   wherein the laminated film is substantially incorporated within an optical lens body of polymerized optical lens material,
   wherein the first and second adhesive layers provide a stable bonding to the optical lens material in the optical lens body, and
   wherein the first adhesive layer, the first barrier layer, the photochromic layer, the second barrier layer, and the second adhesive layer are arranged in succession and directly adjacent to each other, respectively.

2. The photochromic lens according to claim 1, wherein at least one of the first adhesive layer and the second adhesive layer comprises or consists of a compound selected from the group consisting of an epoxy monomer, an acrylate monomer, a methacrylate monomer, a methacrylate, an acrylate oligomer, a methacrylate oligomer, a polyurethane, a polyepoxy, a polyacrylate, a polymethacrylate, a polyvinyl alcohol (PVA), a polyvinyl formal (PVF), a polyvinyl acetate (PVAc), a saponified (ethylene, vinyl acetate) copolymer, a silicone, a natural rubber, a synthetic rubber, and a styrene block copolymer, or a mixture thereof.

3. The photochromic lens according to claim 1, wherein at least one of the first barrier layer and the second barrier layer comprises or consists of a compound selected from the group consisting of a cellulose based polymer, a polycarbonate (PC) based polymer, a polyester based polymer, an acrylate based polymer, a methacrylate polymer, a thermoplastic urethane polymers (TPU), a polythiourethane based polymer, a vinyl based polymer, a styrene based polymer, an olefin based polymer, an amide based polymer, an imide based polymer, a polyether imide based polymer, a polysulfone based polymer; a polyether sulfone based polymer, a polyether ether ketone based polymer, a polyphenylene sulfide based polymer, a polyoxymethylene based polymers, and an epoxy based polymer, or a blend thereof.

4. The photochromic lens according to claim 1, wherein the second barrier layer performs an additional optical function.

5. The photochromic lens according to claim 4, wherein the additional optical function is at least one of UV protection, light polarization, and base coloration.

6. The photochromic lens according to claim 1, wherein the photochromic layer comprises at least one photochromic dye.

7. The photochromic lens according to claim 6, wherein the at least one photochromic dye is selected from the group consisting of a naphthopyran, a spironaphthopyran, an oxazine, a spironaphthoxazine, a benzopyran, a spirobenzoxzine, a spirobenzopyran, a spiropyran, a chromene, a fulgide, a fulgimide, a spirooxazine, an organo-metal dithiozonate, a triarylmethane, a stilbene, an azastilbene, a nitrone, and a quinone, or a mixture thereof.

8. The photochromic lens according to claim 1, wherein the photochromic layer comprises a cellulose ester.

9. The photochromic lens according to claim 1, wherein the optical lens body comprises or consists of an organic glass.

10. The photochromic lens according to claim 9, wherein the organic glass comprises or consists of a polymeric material selected from the group consisting of a polythiourethane, a polyepisulphide, a polymethyl methacrylate, a polycarbonate, a polyallyldiglycolcarbonate, a polyacrylate, a polyurethane, a polyurea, a polyamide, a polysulphone, a polyallyl, a fumaric acid polymer, a polystyrene, a polymethyl acrylate, and a biopolymer, or a mixture thereof.

11. A spectacle frame comprising the photochromic lens according to claim 1.

12. A method for producing the photochromic lens according to claim 1, the method comprising:

arranging the first adhesive layer, the first barrier layer, the photochromic layer, the second barrier layer, and the second adhesive layer in succession to provide a laminated film; and applying an optical lens material to the laminated film to substantially incorporate the laminated film in the optical lens material.

13. The method according to claim 12, further comprising:

arranging the laminated film in a casting mold for casting an optical lens;

providing the casting mold with a liquid or molten optical lens material and substantially encapsulating the laminated film within the liquid or molten optical lens material; and solidifying the liquid or molten optical lens material.

14. A photochromic lens having a laminated film, the laminated film consisting of:

a first adhesive layer;
a first barrier layer;
a photochromic layer;
a second barrier layer; and
a second adhesive layer;

wherein the first adhesive layer, the first barrier layer, the photochromic layer, the second barrier layer, and the second adhesive layer are arranged in succession, wherein the laminated film is substantially incorporated within an optical lens body of polymerized optical lens material, wherein the first and second adhesive layers provide a stable bonding to the optical lens material in the optical lens body, wherein the first adhesive layer, the first barrier layer, the photochromic layer, the second barrier layer, and the second adhesive layer are arranged in succession and directly adjacent to each other, respectively, and wherein the first barrier layer and the second barrier layer respectively consist of a compound selected from the group consisting of triacetyl cellulose (TAC), polyethyleneterephthalate (PET), and polycarbonate (PC), or a blend thereof.

* * * * *

UNITED STATES PATENT AND TRADEMARK OFFICE
CERTIFICATE OF CORRECTION

PATENT NO. : 11,754,860 B2  
APPLICATION NO. : 16/724210  
DATED : September 12, 2023  
INVENTOR(S) : Jingye Liang et al.

Page 1 of 1

It is certified that error appears in the above-identified patent and that said Letters Patent is hereby corrected as shown below:

On the Title Page

Change "Item (63) – Related U.S. Application Data: Continuation of application No. PCT/CN2018/123150 filed on Dec. 24, 2018" to -- Item (30) Foreign Application Priority Data: Dec. 24, 2018 (CN) PCT/CN2018/123150 --

Signed and Sealed this  
Tenth Day of October, 2023

Katherine Kelly Vidal  
*Director of the United States Patent and Trademark Office*